(12) United States Patent
Zhao et al.

(10) Patent No.: US 9,062,385 B2
(45) Date of Patent: Jun. 23, 2015

(54) METHOD AND DEVICE FOR EXTRACTING AND ENRICHING LITHIUM

(71) Applicant: CENTRAL SOUTH UNIVERSITY, Changsha (CN)

(72) Inventors: Zhongwei Zhao, Changsha (CN); Xuheng Liu, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 185 days.

(21) Appl. No.: 13/798,043

(22) Filed: Mar. 12, 2013

(65) Prior Publication Data
US 2013/0186760 A1   Jul. 25, 2013

Related U.S. Application Data

(63) Continuation-in-part of application No. PCT/CN2011/001896, filed on Nov. 11, 2011.

(30) Foreign Application Priority Data

Nov. 19, 2010 (CN) .......................... 2010 1 0552141
Nov. 19, 2010 (CN) .......................... 2010 1 0552143
Nov. 19, 2010 (CN) .......................... 2010 1 0555927

(51) Int. Cl.
*C25C 1/22* (2006.01)
*C22B 26/12* (2006.01)

(52) U.S. Cl.
CPC .. *C25C 1/22* (2013.01); *C22B 26/12* (2013.01)

(58) Field of Classification Search
CPC ........... C02F 2001/46138; C02F 1/461; C02F 1/46104; C22B 26/12; C25C 1/02; C25C 7/02
USPC .......... 205/750, 759, 771; 204/252, 291, 539, 204/630
See application file for complete search history.

(56) References Cited

U.S. PATENT DOCUMENTS

| | | | |
|---|---|---|---|
| 5,240,572 A * | 8/1993 | Turner et al. ................... | 205/760 |
| 8,859,143 B2 * | 10/2014 | Zhamu et al. ................. | 429/215 |
| 2004/0099526 A1 * | 5/2004 | Ito et al. ........................ | 204/291 |
| 2007/0051620 A1 * | 3/2007 | Visco et al. .................... | 204/280 |
| 2007/0190422 A1 * | 8/2007 | Morris ........................ | 429/231.4 |
| 2009/0280405 A1 * | 11/2009 | Sannier et al. ................. | 429/207 |

FOREIGN PATENT DOCUMENTS

JP      2000195553 A  *  7/2000
WO   WO 2010051540 A1 *  5/2010

* cited by examiner

*Primary Examiner* — Keith Hendricks
*Assistant Examiner* — Steven A. Friday
(74) *Attorney, Agent, or Firm* — Matthias Scholl P.C.; Matthias Scholl (57) ABSTRACT

A method for extracting and enriching lithium, including: (a) providing an electrodialysis device including an electrodialysis cell; (b) dividing the electrodialysis cell into a lithium salt chamber and a brine chamber using an anion exchange membrane; (c) filling the brine chamber with salt lake brine; (d) filling the lithium salt chamber with a $Mg^{2+}$ free supporting electrolyte solution; (e) placing a conductive substrate coated with an ion sieve in the brine chamber to operate as a cathode; (f) placing a conductive substrate coated with a lithium-intercalated ion sieve in the lithium salt chamber to operate as an anode; and (g) carrying out an electrodialysis.

19 Claims, 3 Drawing Sheets

METHOD AND DEVICE FOR EXTRACTING AND ENRICHING LITHIUM

CROSS-REFERENCE TO RELATED APPLICATIONS

This application is a continuation-in-part of International Patent Application No. PCT/CN2011/001896 with an international filing date of Nov. 11, 2011, designating the United States, now pending, and further claims priority benefits to Chinese Patent Application No. 201010555927.3 filed Nov. 19, 2010, to Chinese Patent Application No. 201010552141.6 filed Nov. 19, 2010, and to Chinese Patent Application No. 201010552143.5 filed Nov. 19, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the metallurgical field, and more particularly to a method and a device for extracting and enriching lithium.

2. Description of the Related Art

Lithium exists in nature in the form of ore and brine. Most lithium exists in brine, and especially in salt lake brine, the reserve of which is more than 80% of the total reserve. However, with the rapidly growing market demands, the lithium from the ore cannot meet the demands, and the exploration cost is very high. Recently, more and more attention has been aroused to lithium in the salt lake brine. The brine usually includes chlorides, sulfates, and carbonates of sodium, potassium, magnesium, calcium, boron, and lithium. In addition to rare salt lakes having a low ratio of magnesium to lithium (6:1), in most salt lake brine, the ratio of magnesium to lithium is higher than 40, and the ratio is even higher than 1800 in some salt lakes. Lithium coexists with a large amount of alkaline-earth metals. In accordance with the diagonal rule, the chemical property of $Mg^{2+}$ is very similar to that of $Li^+$, so that the separation of the lithium from the magnesium is very difficult, the extraction cost of lithium has been largely increased, which restricts the extraction and application of lithium. Methods such as precipitation, carbonization, ion exchange, and solvent extraction have been applied to solve the technical problem and find a way to effectively explore lithium recourse in brine. However, most of these methods have complicate process, high cost, strong corrosion to the device, low product purity, and is inconvenient for mass production.

SUMMARY OF THE INVENTION

In view of the above-described problems, it is one objective of the invention to provide a method and a device for extracting and enriching lithium. The method and device can effectively separate lithium from magnesium, and at the same time obtain a lithium-enriched solution. The method has short process flow, simple and continuous operation, low production cost, and convenient industrial application.

To achieve the above objective, in accordance with one embodiment of the invention, there is provided a method for extracting and enriching lithium, the method comprising:

1) providing an electrodialysis device comprising an electrodialysis cell, dividing the electrodialysis cell into a lithium salt chamber and a brine chamber using anion exchange membrane; filling the brine chamber with salt lake brine; and filling the lithium salt chamber with a $Mg^{2+}$ free supporting electrolyte solution, such as a solution of $NaCl$, $KCl$, $NH_4Cl$, $Na_2SO_4$, $K_2SO_4$, $NaNO_3$, or $KNO_3$;
2) placing a conductive substrate coated with an ion sieve in the brine chamber to operate as a cathode, placing a conductive substrate coated with a lithium-intercalated ion sieve in the lithium salt chamber to operate as an anode; and carrying out electrodialysis, the ion sieve being capable of intercalating $Li^+$ in the brine chamber to transform into another lithium-intercalated ion sieve under an external electric potential, the lithium-intercalated ion sieve being capable of releasing $Li^+$ into a conductive solution to transform into another ion sieve under the external electric potential, and after the intercalating and releasing of $Li^+$ respectively by the ion sieve and the lithium-intercalated ion sieve, $Li^+$ being separated from $Mg^{2+}$ and other cations and being enriched in the lithium salt chamber to yield a lithium-enriched solution.

After step 2), $Li^+$ in the brine chamber is intercalated into the ion sieve which then transforms into the lithium-intercalated ion sieve; and meanwhile, the lithium-intercalated ion sieve in the lithium salt chamber releases $Li^+$ into the conductive solution and transforms into the ion sieve. Therefore, the two electrodes can be reused by exchanging positions.

In a class of this embodiment, the method further comprises: discharging a liquid from the brine chamber after the lithium intercalation; refilling the brine chamber with the salt lake brine; exchanging positions of the cathode and the anode; and continuing electrodialysis.

Optionally, after step 2), to avoid exchanging the positions of the cathode and the anode, the following step can be carried out to separate $Li^+$ from $Mg^{2+}$ and other cations, and enrich $Li^+$:

Maintaining positions of the cathode and the anode; discharging a liquid from the brine chamber after the lithium intercalation; transferring a lithium solution from the lithium salt chamber to the brine chamber; and refilling the lithium salt chamber with the salt lake brine; that is, exchanging functions of the brine chamber and the lithium salt chamber, and continuing electrodialysis. Therefore, once repeating the above process, functions of the brine chamber and the lithium salt chamber are exchanged.

In a class of this embodiment, the lithium-intercalated ion sieve is selected from a lithium iron phosphate, $LiMn_2O_4$, or a mixture thereof; or is formed by the intercalation of $Li^+$ from the brine of the brine chamber into the ion sieve under the external electric potential in the presence of iron phosphate, lithium titanate, $MnO_2$, or a mixture thereof. The lithium iron phosphate is selected from $LiFePO_4$, $Li_xMe_yFePO_4$, $LiFe_xMe_yPO_4$, $LiFePO_4/C$, $Li_xMe_yFePO_4/C$, $LiFe_xMe_yPO_4/C$, or a mixture thereof, in which, Me represents Mn, Co, Mo, Ti, Al, Ni, Nb, or a mixture thereof; $0<x<1$; and $0<y<1$.

In a class of this embodiment, the lithium-intercalated ion sieve is obtained as follows: dividing the electrodialysis device into the lithium salt chamber and the brine chamber using the anion exchange membrane, filling the brine chamber with the salt lake brine, and filling the lithium salt chamber with the $Mg^{2+}$ free supporting electrolyte solution; placing the conductive substrate coated with the ion sieve in the brine chamber to operate as the cathode, the ion sieve having preferential adsorption to Li$^+$; employing an inert electrode as a counter electrode and carrying out cathodic polarization, whereby the ion sieve is transformed into the lithium-intercalated ion sieve after Li$^+$ in the brine is intercalated into the ion sieve.

In a class of this embodiment, the ion sieve is selected from an iron phosphate, a lithium titanate, MnO$_2$, or a mixture thereof; or is formed by releasing Li$^+$ from the lithium-intercalated ion sieve into the conductive solution under the external electric potential.

In a class of this embodiment, the iron phosphate is selected from Fe$_{1-x}$Me$_x$PO$_4$, Fe$_{1-x}$Me$_x$PO$_4$/C, or a mixture thereof, in which, Me represents Mn, Co, Mo, Ti, Al, Ni, Nb, or a mixture thereof; and $0 \leq x \leq 0.1$. The lithium titanate is selected from Li$_4$Ti$_5$O$_{12}$, Li$_x$Me$_y$Ti$_5$O$_{12}$, Li$_4$Me$_m$Ti$_n$O$_{12}$, or a mixture thereof; Me represents V, Fe, Co, Mn, Al, Ba, Ag, Zr, Sr, Nb, F, or a mixture thereof; $0<x<4$, $0<y<4$; $0<m<5$; and $0<n<5$.

In a class of this embodiment, the iron phosphate is obtained as follows: dividing the electrodialysis device into the lithium salt chamber and the brine chamber using the anion exchange membrane, filling the brine chamber with the salt lake brine, and filling the lithium salt chamber with the Mg$^{2+}$ free supporting electrolyte solution; placing the conductive substrate coated with lithium iron phosphate in the lithium salt chamber to operate as the anode; employing an inert electrode as a counter electrode and carrying out anodic polarization, whereby the lithium iron phosphate is transformed into iron phosphate after the release of Li$^+$ from the lithium iron phosphate into the solution.

In accordance with another embodiment of the invention, the invention provides a device for separating lithium from magnesium and enriching lithium in salt lake brine, comprising: the electrodialysis device, the electrodialysis device comprising the electrodialysis cell which is divided into the lithium salt chamber and the brine chamber by the anion exchange membrane; the cathode; and the anode. The cathode and the anode are placed respectively in the two chambers. The cathode is the conductive substrate coated with the ion sieve. The anode is the conductive substrate coated with the lithium-intercalated ion sieve.

Key points of the invention lies in that: the ion sieve adopted has a preferential adsorption to Li$^+$ and stable operation in water solution. By adjusting the system potential, Li$^+$ in the solution is intercalated into crystal lattices of the ion sieve, leaving other ions in the solution. Through the process, Li$^+$ is effectively separated from other ions. Thereafter, the lithium-intercalated ion sieve is placed into the Mg$^{2+}$ free supporting electrolyte solution, like NaCl solution, by adjusting the system potential, Li$^+$ in the lithium-intercalated ion sieve is released into the solution to obtain the lithium-enriched solution, so that the effective separation and concentration of lithium is achieved. The ion sieve and the lithium-intercalated ion sieve can be exchanged. Take the ion sieve made from the lithium titanate as an example, place the ion sieve into the solution comprising lithium or the salt lake brine, adjust the electric potential of the system through a voltage of an external circuit, so that the titanium of the ion sieve is reduced, to keep the electric charge balance, Li$^+$ is intercalated into crystal lattices of the lithium titanate to form a lithium-intercalated product. Place the lithium-intercalated product into the supporting electrolyte solution, adjust the electric potential of the system to oxidize the titanium of the ion sieve, so that Li$^+$ is released into the solution and separated from other ions, and meanwhile the ion sieve is renewed, which can be used repeatedly. Take the ion sieve made from the iron phosphate as another example, place the ion sieve into the solution comprising lithium or the salt lake brine, adjust the electric potential of the system through a voltage of an external circuit, so that ferric ions of the ion sieve are reduced to the ferrous ions, to keep the electric charge balance, Li$^+$ is intercalated into crystal lattices of the iron phosphate to form a lithium ion phosphate. Place the lithium ion phosphate into the supporting electrolyte solution, adjust the electric potential of the system to oxidize the ferrous ions of the ion sieve to the ferric ions, so that Li$^+$ is released into the solution and separated from other ions, and meanwhile the ion sieve is renewed to the iron phosphate, which can be used repeatedly.

The invention is advantageous in that, during the operation of the electrodialysis device, Li$^+$ in the brine is intercalated into the ion sieve, and meanwhile, Li$^+$ in the lithium-intercalated ion sieve is released into the lithium salt chamber. This process effectively lowers the energy consumption and improves the efficiency of lithium extraction.

Specifically, the method is carried out as follows:

1) the primary intercalation of lithium into the ion sieve: divide the electrodialysis device into the lithium salt chamber and the brine chamber via the anion exchange membrane; fill the brine chamber with the salt lake brine, and fill the lithium salt chamber with the Mg$^{2+}$ free supporting electrolyte solution; place the conductive substrate coated with the ion sieve in the brine chamber to operate as the cathode, the ion sieve has a preferential adsorption to Li$^+$; the inert electrode is used as the counter electrode, and carry out cathodic polarization, so that the ion sieve is transformed into the lithium-intercalated ion sieve after Li$^+$ in the brine is intercalated into the ion sieve.

2) separation of lithium from magnesium: place the conductive substrate coated with the ion sieve into the brine chamber to operate as the cathode, and fill the brine chamber with the brine; place the conductive substrate coated with the lithium intercalated ion sieve into the lithium salt chamber to operate as the anode, and fill the lithium salt chamber with the Mg$^{2+}$ free supporting electrolyte solution. Driven by the external electric potential, Li$^+$ in the brine of the brine chamber is intercalated into the ion sieve to transform into the lithium intercalated ion sieve, and Li$^+$ in the lithium intercalated ion sieve in the lithium salt chamber is released into the conductive solution. As the anion exchange membrane prevents cations from transferring between the brine chamber and the lithium salt chamber, anions transfer from the brine chamber to the lithium salt chamber via the anion exchange membrane to maintain the charge balance, whereas Li$^+$ in the brine chamber is transferred to the lithium chamber through a solid phase.

3) after step 2), to further separate Li$^+$ from Mg$^{2+}$ and other cations, and meanwhile concentrate Li$^+$, the following steps can be carried out:

Discharge the liquid from the brine chamber after the lithium intercalation; and refill the brine chamber with the salt lake brine. Transfer the conductive substrate coated with the ion sieve obtained from step 2) from the lithium salt chamber to the brine chamber as the cathode; transfer the consequent conductive substrate coated with the lithium intercalated ion sieve from the brine chamber to the lithium slat chamber as the anode; and carry out electrodialysis. Thereafter, Li$^+$ in the brine are intercalated into the ion sieve; whereas the lithium intercalated ion sieve releases Li$^+$ into the lithium salt chamber, so that Li$^+$ is transferred from the brine chamber to the lithium salt chamber through the solid phase. Not only the separation of Li$^+$ from Mg$^{2+}$ and other cations is further achieved, but also Li$^+$ is concentrated in the lithium salt chamber and a lithium-enriched solution is obtained. The above electrodialysis can be repeatedly carried out to realize lithium concentration. When Li$^+$ concentration in the lithium-enriched solution reaches a certain degree, lithium can be directly extracted.

To simplify the above operations, and avoid continuously position exchange of the two electrodes between the brine chamber and the lithium salt chamber, step 3) can be carried out as follows: after step 2), maintain positions of the cathode and the anode; discharge the liquid from the brine chamber after the lithium intercalation; transfer the lithium solution from the lithium salt chamber to the chamber where the lithium intercalated ion sieve is placed, that is the brine chamber; and fill the chamber where the ion sieve is placed, that is the lithium salt chamber, with salt lake brine. Thus, the former brine chamber is changed into a new lithium salt chamber, and the former lithium salt chamber is changed into a new brine chamber; that is, functions of the lithium salt chamber and the brine chamber are exchanged. Continue electrodialysis, and repeat the above substitute of step 3) to realize the separation of Li$^+$ from Mg$^{2+}$ and other cations, and to obtain the lithium-enriched solution. The above electrodialysis can be repeatedly carried out to realize lithium concentration. When Li$^+$ concentration in the lithium-enriched solution reaches a certain degree, lithium can be directly extracted.

In accordance with the above method, when using the iron phosphate as the ion sieve to separate and concentrate of lithium from magnesium, the following steps can be carried out:

1) place the conductive substrate coated with the lithium iron phosphate as the anode in the conductive solution, and use the inert electrode as the cathode. Apply an external electric potential on the two electrodes, whereby the lithium iron phosphate releases Li$^+$ into the solution to form the iron phosphate ion sieve.

2) separation of lithium from magnesium: place the iron phosphate ion sieve obtained in step 1) into the brine chamber as the cathode, and fill the brine chamber with the brine. Place the conductive substrate coated with the lithium iron phosphate into the lithium salt chamber as the anode, and fill the lithium salt chamber with the Mg$^{2+}$ free supporting electrolyte solution. Driven by the external electric potential, Li$^+$ in the brine of the brine chamber is intercalated into the ion sieve to transform into the lithium intercalated ion sieve; and meanwhile, Li$^+$ in the lithium iron phosphate in the lithium salt chamber is released into the conductive solution. As the anion exchange membrane prevents cations from transferring between the brine chamber and the lithium salt chamber, anions transfer from the brine chamber to the lithium salt chamber through the anion exchange membrane to maintain the charge balance. The total effect of step 1) and 2) is that: Li$^+$ in the brine chamber is first transferred to the ion sieve in a solid phase, and then to the lithium chamber, thus separation of lithium from magnesium is achieved.

The lithium iron phosphate is selected from LiFePO$_4$, Li$_x$Me$_y$FePO$_4$, LiFe$_x$Me$_y$PO$_4$, LiFePO$_4$/C, Li$_x$Me$_y$FePO$_4$/C, LiFe$_x$Me$_y$PO$_4$/C, or a mixture thereof, in which, Me represents Mn, Co, Mo, Ti, Al, Ni, Nb, or a mixture thereof, 0<x<1, and 0<y<1.

The salt lake brine is selected from a solution comprising lithium ions, a primary salt lake brine, an evaporated salt lake brine, an evaporated salt lake brine after potassium extraction, or a mixture thereof.

The conductive substrate is a ruthenium coated titanium mesh, a graphite plate, a platinum group metal or an alloy foil thereof, a carbon cloth, or a graphite paper.

Parameters of the electrodialysis device are as follows: solution temperature: 0-80° C.; pH value: 2-12; and voltage between the two electrodes: 0.5-2 V.

Advantages of the invention are summarized as follows:

1. the method can process brines with different ratios of magnesium to lithium, and more particularly, it can solve the technical problem of separation lithium from a brine having a high ratio of magnesium to lithium;
2. the electrodialysis device in accordance with the method can realize lithium releasing and intercalating synchronously on two electrodes, and effectively realize the preferential adsorption to lithium; the electrodialysis needs a low voltage, so that, the device is energy saving; after one cycle of operation, another cycle can be continued via exchanging positions of the two electrodes or transferring the electrolyte solution;
3. the electrodialysis device in accordance with the method can separate lithium from magnesium, and at the same time achieve the lithium concentration; the device has a simple structure, convenient operation, and can process the salt lake brine in cycle;
4. the method has low production cost and is suitable for large-scale production; and
5. the ion sieve of the invention has a good selectivity to Li$^+$, and strong capability of lithium adsorption, good stability, and is capable of repeatedly concentrating lithium in the brine.

BRIEF DESCRIPTION OF THE DRAWINGS

The invention is described hereinbelow with reference to the accompanying drawings, in which.

DETAILED DESCRIPTION OF THE EMBODIMENTS

To further illustrate the invention, experiments detailing a method and a device for separating lithium from magnesium and extracting and enriching lithium in salt lake brine are described below. It should be noted that the following examples are intended to describe and not to limit the invention.

Figure 1:
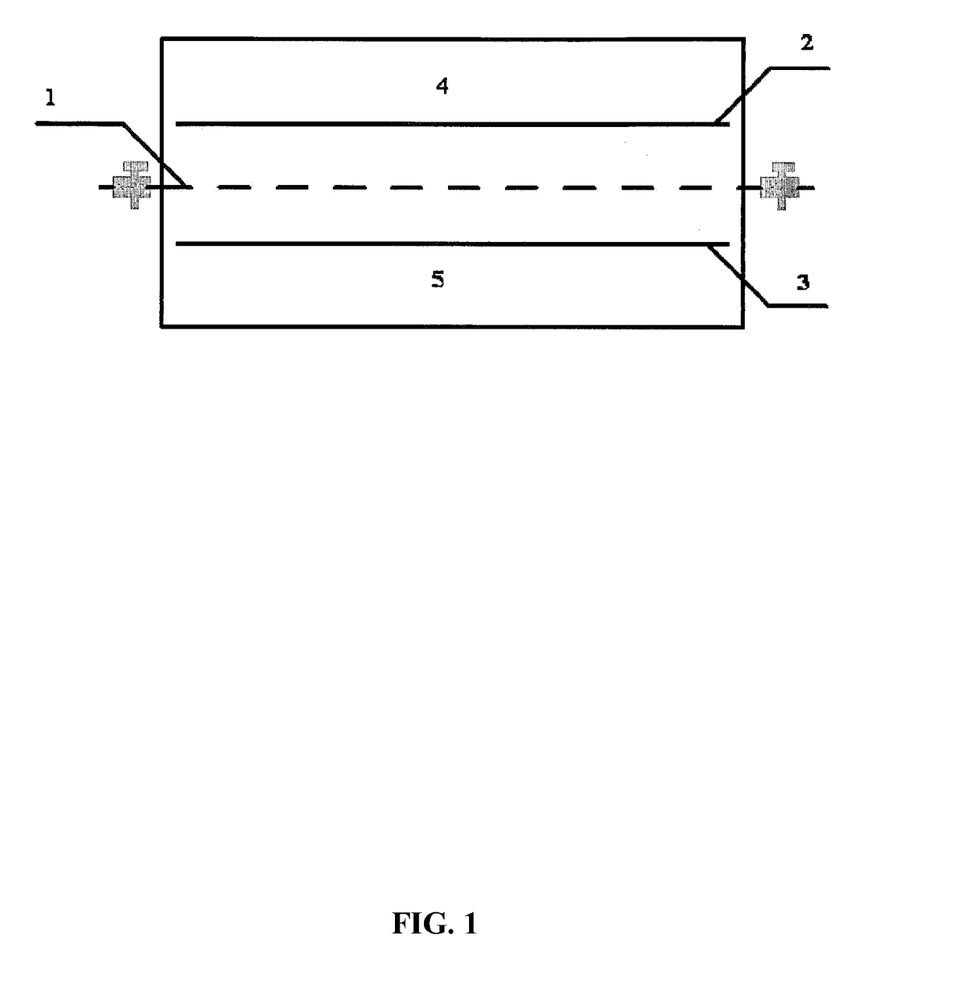
FIG. 1 is a top view of an electrodialysis cell in accordance with one embodiment of the invention, in which, the following reference numbers are used: 1. Anion exchange membrane; 2. Cathode; 3. Anode; 4. Brine chamber; 5. Lithium salt chamber.

An electrodialysis device of the invention, as shown in FIG. 1, comprises an electrodialysis cell which is divided into two chambers by an anion exchange membrane 1, that is, a brine chamber 4 and a lithium salt chamber 5. A cathode 2 and an anode 3 are arranged in the two chambers. The cathode 2 is a conductive substrate coated with an ion sieve, and the anode 3 is a conductive substrate coated with a lithium-intercalated ion sieve.

EXAMPLE 1

10 g of FePO$_4$, 0.5 g of a high purity graphite, and 0.5 g of a polyvinylidene fluoride (PVDF) were collected according to a weight ratio of 20:1:1 and mixed to form a mixture. The mixture was mixed with an organic solvent of N-Methyl-2-pyrrolidone (NMP), ground, and mashed to yield a slurry.

Thereafter, a graphite plate was coated with the slurry, and dried in a vacuum box at 110° C. for 12 h. After being cooled, a composite membrane of an iron phosphate ion sieve was obtained. The composite membrane of the iron phosphate ion sieve was placed into a brine chamber of an electrodialysis device, a top view of which is shown in FIG. 1, the brine chamber was filled with 2 L of salt lake brine. Main components and corresponding contents of the salt lake brine are listed in Table 1:

TABLE 1

| Component | Concentration (mg/L) |
|---|---|
| $Li^+$ | 500 |
| $Na^+$ | 2350 |
| $Mg^{2+}$ | 18000 |
| $K^+$ | 950 |
| $Ca^{2+}$ | 90 |

A lithium salt chamber was filled with 500 mL of NaCl solution having a concentration of 20 g/L; the iron phosphate ion sieve was used as a cathode, and an inert graphite was used as an anode and placed in the lithium salt chamber. A voltage of 0.5 V was applied to the two electrodes at 25° C. for 15 h. Thereafter, the brine chamber had a $Li^+$ concentration being reduced to 358 mg/L, and 17994 mg/L of a $Mg^{2+}$ concentration; the iron phosphate ion sieve had a $Li^+$ adsorption of 28.4 mg/g, and a $Mg^{2+}$ adsorption of 1.2 mg/g.

After the primary lithium intercalation, solutions in the brine chamber and the lithium salt chamber were discharged. The lithium intercalated iron phosphate ion sieve was placed into the lithium salt chamber which was then refilled with 500 mL of NaCl solution having the concentration of 20 g/L. According to the above method of this example, another composite membrane of the iron phosphate ion sieve was prepared with 10 g of $FePO_4$. The composite membrane of the iron phosphate ion sieve was placed into the brine chamber which was refilled with 2 L of the salt lake brine. The iron phosphate ion sieve was used as the cathode, and the lithium intercalated iron phosphate ion sieve was used as the anode. A voltage of 0.8 V was applied to the two electrodes at the temperature of 25° C. and a PH of 2 for 12 h. The brine chamber has $Li^+$ concentration being reduced to 345 mg/L, and 17995 mg/L of the $Mg^{2+}$ concentration; the iron phosphate ion sieve has the $Li^+$ adsorption of 31 mg/g, and the $Mg^{2+}$ adsorption of 1 mg/g; and meanwhile, a lithium-enriched solution having the $Li^+$ concentration of 561 mg/L was obtained in the lithium salt chamber.

EXAMPLE 2

9 g of $Fe_{0.99}Mn_{0.01}PO_4$, 0.5 g of a high purity graphite, and 0.5 g of a PVDF were collected according to a weight ratio of 90:5:5 and mixed to form a mixture. The mixture was mixed with an organic solvent of NMP, ground, and mashed into a slurry. Thereafter, the slurry was sprayed or brushed on a ruthenium coated titanium mesh which was then dried in a vacuum box at 110° C. for 10 h. After being cooled, a composite membrane of an iron phosphate ion sieve was obtained.

The composite membrane of the iron phosphate ion sieve was placed into a brine chamber which was filled with 2 L of salt lake brine. Main components and corresponding contents of the salt lake brine are listed in Table 2:

TABLE 2

| Component | Concentration (mg/L) |
|---|---|
| $Li^+$ | 200 |
| $Na^+$ | 2580 |
| $Mg^{2+}$ | 1260 |
| $K^+$ | 780 |

A lithium salt chamber was filled with 200 mL of NaCl solution having a concentration of 50 g/L; the iron phosphate ion sieve was used as a cathode, and a Pt electrode was placed into the lithium salt chamber as an anode. A voltage of 1.0 V was applied to the two electrodes at 50° C. for 10 h. Thereafter, the brine chamber had a $Li^+$ concentration being reduced to 55.1 mg/L, and a $Mg^{2+}$ concentration of 1254 mg/L; the iron phosphate ion sieve had a $Li^+$ adsorption of 32.2 mg/g, and a $Mg^{2+}$ adsorption of 1.33 mg/g.

Figure 2:
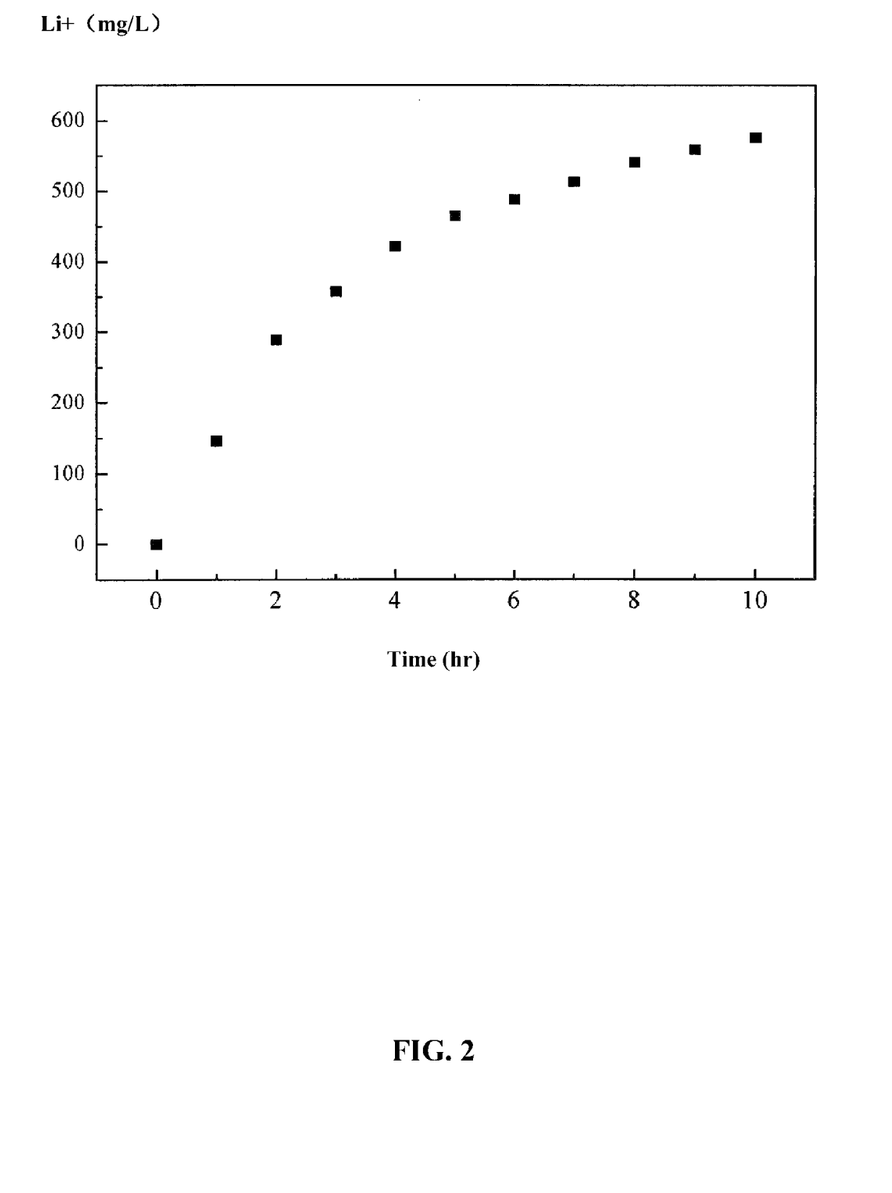
FIG. 2 is a relation chart between Li$^+$ concentration and an electrodialysis duration.

After the primary lithium intercalation, solutions in the brine chamber and the lithium salt chamber were discharged. The lithium intercalated iron phosphate ion sieve was placed into the lithium salt chamber which was then refilled with 500 mL of the NaCl solution having the concentration of 50 g/L. According to the above method of this example, another composite membrane of the iron phosphate ion sieve was prepared with 9 g of $Fe_{0.99}Mn_{0.01}PO_4$. The composite membrane of the iron phosphate ion sieve was then placed into the brine chamber which was refilled with 2 L of the salt lake brine. The iron phosphate ion sieve was used as the cathode, and the lithium intercalated iron phosphate ion sieve was used as the anode. A voltage of 1.5 V was applied to the two electrodes to carry out the electrodialysis, at the temperature of 50° C. and a PH of 7. The $Li^+$ concentration in the lithium salt chamber was measured every 1 h, the result of which are shown in FIG. 2. After 10 h electrodialysis, the brine chamber has the $Li^+$ concentration being reduced to 55 mg/L, and the $Mg^{2+}$ concentration of 1254 mg/L; the iron phosphate ion sieve has the $Li^+$ adsorption of 32.2 mg/g, and the $Mg^{2+}$ adsorption of 1.33 mg/g; and meanwhile, a lithium-enriched solution having the $Li^+$ concentration of 576 mg/L was obtained in the lithium salt chamber.

EXAMPLE 3

According to the method of Example 2, 3 g of $Fe_{0.99}Mn_{0.01}PO_4$ was used to prepare a composite membrane of an iron phosphate ion sieve. The composite membrane of the iron phosphate ion sieve was placed into a brine chamber which was filled with 500 mL of salt lake brine. Main components and corresponding contents of the salt lake brine are listed in Table 3:

TABLE 3

| Component | Concentration (mg/L) |
|---|---|
| $Li^+$ | 500 |
| $Na^+$ | 2350 |
| $Mg^{2+}$ | 18000 |
| $K^+$ | 950 |
| $Ca^{2+}$ | 90 |

A lithium salt chamber was filled with 500 mL of NaCl solution having a concentration of 50 g/L; the iron phosphate ion sieve was used as a cathode, and an inert graphite was used as an anode. A voltage of 2.0 V was applied to the two electrodes at 80° C. for 10 h. Thereafter, the brine chamber had a $Li^+$ concentration being reduced to 268.4 mg/L, and a $Mg^{2+}$ concentration of 17991 mg/L; the $Fe_{0.99}Mn_{0.01}PO_4$ iron phosphate ion sieve had a $Li^+$ adsorption of 38.6 mg/g, and a $Mg^{2+}$ adsorption of 1.5 mg/g.

According to the above method of this example, another composite membrane of the iron phosphate ion sieve was prepared with 3 g of $Fe_{0.99}Mn_{0.01}PO_4$. After the primary lithium intercalation, the composite membrane of the iron phosphate ion sieve was placed into the brine chamber which was refilled with 500 mL of the salt lake brine; and the lithium intercalated iron phosphate ion sieve was placed into the lithium salt chamber which was then refilled with 500 mL of the NaCl solution having the concentration of 50 g/L. The lithium intercalated iron phosphate ion sieve was used as the anode, and the iron phosphate ion sieve was used as the cathode. The voltage of 2.0 V was applied to the two electrodes to carry out the electrodialysis at the temperature of 80° C. and a PH of 12 for 10 h. After the electrodialysis, the $Li^+$ concentration in the lithium salt chamber was reduced to 269.1 mg/L; a lithium-enriched solution having the $Li^+$ concentration of 115 mg/L was obtained in the lithium salt chamber; and meanwhile, forms of the lithium intercalated iron phosphate ion sieve and the iron phosphate ion sieve were exchanged. Positions of the two electrodes were maintained, a liquid after the lithium intercalation was discharged, and the lithium-enriched solution was transferred to the former brine chamber via a storage tank. A new brine chamber (the former lithium salt chamber) was filled with 500 mL of the salt lake brine, and a second electrodialysis was carried out under the same conditions. After that, the $Li^+$ concentration of the lithium-enriched solution in the lithium salt chamber was increased to 229 mg/L.

Figure 3:
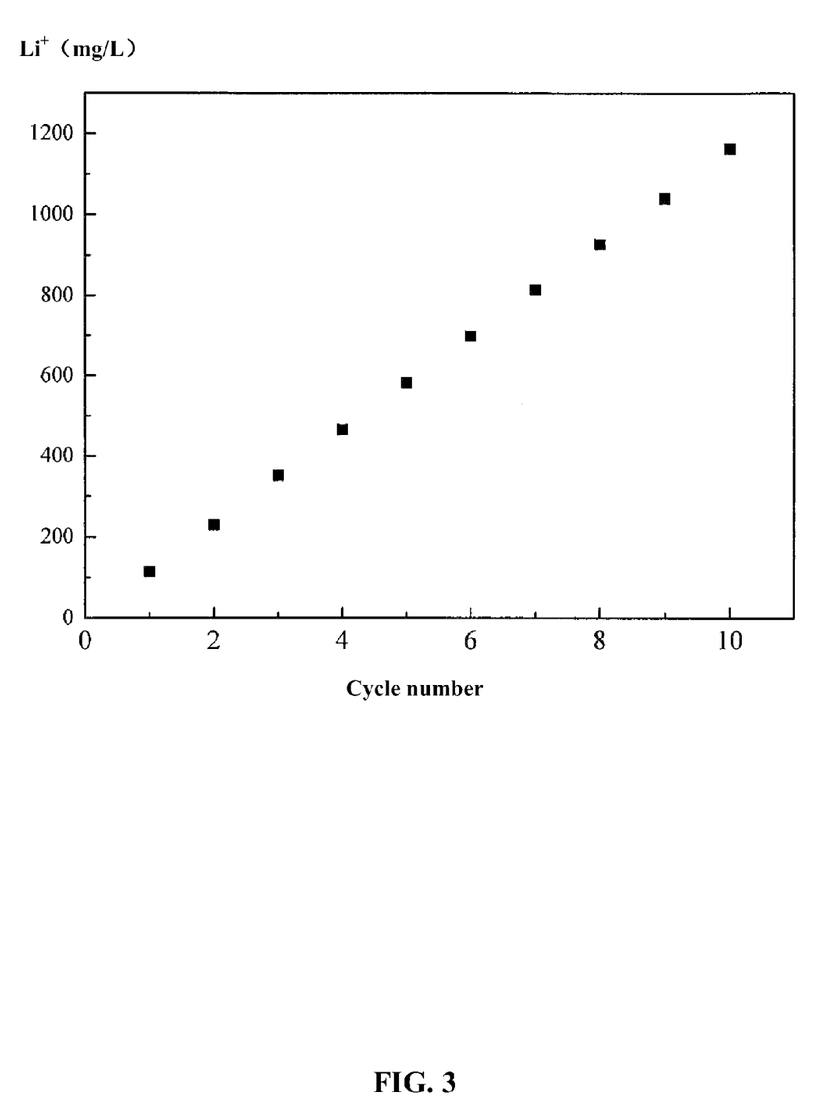
FIG. 3 is a relation chart between Li$^+$ concentration and electrodialysis cycles.

Such electrodialysis of lithium intercalation/release was repeated for several times. After a third electrodialysis, the $Li^+$ concentration of the lithium-enriched solution was increased to 351 mg/L. After a fourth electrodialysis, the $Li^+$ concentration of the lithium-enriched solution was increased to 465 mg/L. 10 times of the electrodialysis were carried out, and after the tenth electrodialysis, the $Li^+$ concentration of the lithium-enriched solution was increased to 1162 mg/L. The change in the $Li^+$ concentration is shown in FIG. 3.

EXAMPLE 4

According to the method of Example 2, 10 g of $MnO_2$ was used to prepare a composite membrane of $MnO_2$ ion sieve. The composite membrane of $MnO_2$ ion sieve was placed into a brine chamber which was filled with 1 L of salt lake brine. Main components and corresponding contents of the salt lake brine are the same as those of the salt lake brine in example 3. A graphite electrode was placed in a lithium salt chamber which was filled with 500 mL of NaCl solution having a concentration of 20 g/L. The composite membrane of $MnO_2$ ion sieve was used as a cathode, and the graphite electrode was used as an anode. A voltage of 1.2 V was applied to the two electrodes at 5° C. for 12 h. Thereafter, the brine chamber had a $Li^+$ concentration being reduced to 286 mg/L, and a $Mg^{2+}$ concentration of 17982 mg/L; the ion sieve had a $Li^+$ adsorption of 21.4 mg/g, and a $Mg^{2+}$ adsorption of 1.8 mg/g.

According to the above method of this example, another composite membrane of $MnO_2$ ion sieve was prepared with 10 g of $MnO_2$. After the primary lithium intercalation, the $MnO_2$ ion sieve was placed into the brine chamber which was refilled with 1 L of the salt lake brine; and the lithium intercalated $MnO_2$ ion sieve was placed into the lithium salt chamber which was then refilled with 500 mL of the NaCl solution having the concentration of 20 g/L. The lithium intercalated $MnO_2$ ion sieve was used as the anode, and the $MnO_2$ ion sieve was used as the cathode. The voltage of 1.2 V was applied to the two electrodes to carry out the electrodialysis, at 5° C. for 10 h. After the electrodialysis, the $Li^+$ concentration in the lithium salt chamber was reduced to 284.2 mg/L; a lithium-enriched solution having the $Li^+$ concentration of 428.3 mg/L was obtained in the lithium salt chamber.

After the electrodialysis, forms of the lithium intercalated $MnO_2$ ion sieve and the $MnO_2$ ion sieve were exchanged. Positions of the two electrodes were maintained, a liquid after the lithium intercalation was discharged, and 500 mL of the lithium-enriched solution was transferred to the former brine chamber via a storage tank. A new brine chamber (the former lithium salt chamber) was refilled with 1 L of the salt lake brine, and a second electrodialysis was carried out under the same conditions. After the second electrodialysis, the $Li^+$ concentration of the brine chamber was reduced to 286.3 mg/L, and the $Li^+$ concentration of the lithium-enriched solution in the lithium salt chamber was increased to 855.1 mg/L.

EXAMPLE 5

2 g of $Li_4Ti_5O_{12}$, 0.25 g of an acetylene black, and 0.25 g of a PVDF were collected according to a weight ratio of 8:1:1 and mixed to form a mixture. The mixture was mixed with an organic solvent of NMP, ground, and mashed into a slurry. Thereafter, a graphite paper was coated with the slurry, and dried in a vacuum box at 120° C. for 12 h. After being cooled, a composite membrane of a $Li_4Ti_5O_{12}$ ion sieve was obtained. The composite membrane of the $Li_4Ti_5O_{12}$ ion sieve was placed into a brine chamber of an electrodialysis device, the brine chamber was filled with 1 L of salt lake brine. Main components and corresponding contents of the salt lake brine are listed in Table 4:

TABLE 4

| Component | Concentration (mg/L) |
| --- | --- |
| $Li^+$ | 200 |
| $Na^+$ | 2580 |
| $Mg^{2+}$ | 1260 |
| $K^+$ | 780 |

A graphite electrode was placed into a lithium salt chamber which was filled with 500 mL of NaCl solution having a concentration of 20 g/L. The graphite electrode was used as an anode, and the $Li_4Ti_5O_{12}$ ion sieve was used as a cathode. A voltage of 0.8 V was applied to the two electrodes at 25° C. for 10 h. Thereafter, a $Li^+$ concentration in the brine chamber was reduced to 157.6 mg/L, and a $Mg^{2+}$ concentration in the brine chamber almost had no variation; the $Li_4Ti_5O_{12}$ ion sieve had a $Li^+$ adsorption of 21.2 mg/g.

According to the above method of this example, another composite membrane of the $Li_4Ti_5O_{12}$ ion sieve was prepared with 2 g of $Li_4Ti_5O_{12}$. After the primary lithium intercalation, the composite membrane of the $Li_4Ti_5O_{12}$ ion sieve was placed into the brine chamber which was refilled with 1 L of the salt lake brine. The lithium intercalated $Li_4Ti_5O_{12}$ ion sieve was placed into the lithium salt chamber which was then refilled with 500 mL of the NaCl solution having the concentration of 20 g/L. The lithium intercalated $Li_4Ti_5O_{12}$ ion sieve was used as the anode, and the $Li_4Ti_5O_{12}$ ion sieve was used as the cathode. The voltage of 0.8 V was applied to the two electrodes to carry out the electrodialysis, at 5° C. and a PH of 5 for 10 h. After the electrodialysis, the $Li^+$ concentration in the brine chamber was reduced to 155.4 mg/L, and a lithium-enriched solution having the $Li^+$ concentration of 88.7 mg/L was obtained in the lithium salt chamber.

EXAMPLE 6

4 g of LiFe$_{0.99}$Mn$_{0.01}$PO$_4$/C, 0.5 g of a high purity graphite, and 0.5 g of a PVDF were collected according to a weight ratio of 8:1:1 and mixed to form a mixture. The mixture was mixed with an organic solvent of NMP and ground into a slurry. Thereafter, a graphite electrode was coated with the slurry, and dried in a vacuum box at 110° C. for 12 h. After being cooled, a composite membrane of a lithium iron phosphate ion sieve was obtained. The composite membrane of the lithium iron phosphate ion sieve was used as an anode, and a foam nickel was used as a cathode; both electrodes were placed into 1 L of NaCl solution having a concentration of 30 g/L. A voltage of 1.1 V was applied to the two electrodes for 10 h, thereafter, the composite membrane of the lithium iron phosphate ion sieve was transformed into an iron phosphate ion sieve.

According to the above method of this example, another composite membrane of the lithium iron phosphate ion sieve was prepared with 4 g of LiFe$_{0.99}$Mn$_{0.01}$PO$_4$/C. The composite membrane of the lithium iron phosphate ion sieve was then placed into a lithium salt chamber of an electrodialysis device. The lithium salt chamber was filled with 500 mL of the NaCl solution having the concentration of 30 g/L. The iron phosphate ion sieve was placed into a brine chamber which was filled with 1 L of salt lake brine. Main components and corresponding contents of the salt lake brine are listed in Table 5:

TABLE 5

| Component | Concentration (mg/L) |
|---|---|
| Li$^+$ | 200 |
| Na$^+$ | 2580 |
| Mg$^{2+}$ | 1260 |
| K$^+$ | 780 |

The composite membrane of the lithium iron phosphate ion sieve was used as the anode, and the iron phosphate ion sieve was used as the cathode. A voltage of 1.0 V was applied to the two electrodes at 25° C. and a PH of 8 for 15 h. After the electrodialysis, a Li$^+$ concentration of the brine chamber was reduced to 66.5 mg/L, a Mg$^{2+}$ concentration of the brine chamber was 1257 mg/L, and the Li$^+$ concentration of the lithium salt chamber was 267.4 mg/L.

EXAMPLE 7

2 g of LiFe$_{0.99}$Mn$_{0.01}$PO$_4$/C, 0.25 g of a high purity graphite, and 0.25 g of a PVDF were collected according to a weight ratio of 8:1:1 and mixed to form a mixture. The mixture was mixed with an organic solvent of NMP and ground into a slurry. Thereafter, a carbon cloth was coated with the slurry, and dried in a vacuum box at 110° C. for 12 h. After being cooled, a composite membrane of a lithium iron phosphate ion sieve was obtained. The composite membrane of the lithium iron phosphate ion sieve was used as an anode, and a foam nickel was used as a cathode; both electrodes were placed into 1 L of NaCl solution having a concentration of 20 g/L. A voltage of 1.0 V was applied to the two electrodes for 12 h, thereafter, the composite membrane of the lithium iron phosphate ion sieve was transformed into an iron phosphate ion sieve.

According to the above method of this example, another composite membrane of the lithium iron phosphate ion sieve was prepared with 2 g of LiFe$_{0.99}$Mn$_{0.01}$PO$_4$/C. The composite membrane of the lithium iron phosphate ion sieve was then placed into a lithium salt chamber of an electrodialysis device. The lithium salt chamber was filled with 1 L of NaCl solution having a concentration of 50 g/L. The iron phosphate ion sieve was placed into a brine chamber which was filled with 1 L of salt lake brine. Main components and corresponding contents of the salt lake brine are listed in Table 6:

TABLE 6

| Component | Concentration (mg/L) |
|---|---|
| Li$^+$ | 500 |
| Na$^+$ | 2350 |
| Mg$^{2+}$ | 18000 |
| K$^+$ | 950 |
| Ca$^{2+}$ | 90 |

The composite membrane of the lithium iron phosphate ion sieve was used as the anode, and the iron phosphate ion sieve was used as the cathode. A voltage of 1.0 V was applied to the two electrodes at 30° C. and a PH of 10 for 12 h. After the electrodialysis, a Li$^+$ concentration of the brine chamber was reduced to 442.3 mg/L, and the Li$^+$ concentration of the lithium salt chamber was 57.8 mg/L. After the electrodialysis, forms of the lithium intercalated ion sieve and the ion sieve were exchanged. Positions of the two electrodes were exchanged; that is, the iron phosphate ion sieve transformed from the composite membrane of the lithium ion phosphate ion sieve was transferred from the lithium salt chamber into the brine chamber, and was used as the cathode; the lithium intercalated ion sieve transformed from the iron phosphate ion sieve was transferred from the brine chamber into the lithium chamber, and was used as the anode; and then the electrodialysis was carried out. After the electrodialysis, the Li$^+$ concentration of the brine chamber was 384.6 mg/L, and the Li$^+$ concentration of the lithium salt chamber was increased to 115.7 mg/L.

The electrodialysis was repeated for several times, and after a sixth electrodialysis, the Li$^+$ concentration of the brine chamber was 153.5 mg/L, and the Li$^+$ concentration of the lithium salt chamber was increased to 346.8 mg/L.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for extracting and enriching lithium, the method comprising:
  1) providing an electrodialysis device comprising an electrodialysis cell, dividing the electrodialysis cell into a lithium salt chamber and a brine chamber using an anion exchange membrane; filling the brine chamber with salt lake brine, the salt lake brine comprising Li$^+$ and Mg$^{2+}$; and filling the lithium salt chamber with a Mg$^{2+}$ free supporting electrolyte solution;
  2) coating a first conductive substrate with a first ion sieve, placing the first conductive substrate coated with the first ion sieve in the brine chamber to operate as a cathode, coating a second conductive substrate with a first lithium-intercalated ion sieve, placing the second conductive substrate coated with the first lithium-intercalated ion sieve in the lithium salt chamber to operate as an anode; and
  3) carrying out electrodialysis, inserting Li$^+$ in the brine chamber into the first ion sieve and transforming the first ion sieve into a second lithium-intercalated ion sieve under an external electric potential, releasing Li$^+$ from the first lithium-intercalated ion sieve into the Mg$^{2+}$ free supporting electrolyte solution and transforming the first lithium-intercalated ion sieve into a second ion sieve under the external electric potential, thereby separating Li$^+$ from Mg$^{2+}$ and enriching Li$^+$ in the lithium salt chamber to yield a lithium-enriched solution.

2. The method of claim 1, further comprising: discharging a liquid from the brine chamber after inserting Li$^+$ into the first ion sieve; refilling the brine chamber with the salt lake brine; exchanging positions of the cathode and the anode; and continuing electrodialysis.

3. The method of claim 2, wherein parameters of the electrodialysis device are as follows:
temperature of solutions: 0-80° C.;
pH value of solutions: 2-12; and
voltage between the two electrodes: 0.5-2 V.

4. The method of claim 2, wherein the first lithium-intercalated ion sieve is selected from a lithium iron phosphate, LiMn$_2$O$_4$, or a mixture thereof.

5. The method of claim 1, further comprising: maintaining positions of the cathode and the anode; discharging a liquid from the brine chamber after inserting Li$^+$ into the first ion sieve; transferring a lithium solution from the lithium salt chamber to the brine chamber; and refilling the lithium salt chamber with the salt lake brine, and continuing electrodialysis.

6. The method of claim 5, wherein parameters of the electrodialysis device are as follows:
temperature of solutions: 0-80° C.;
pH value of solutions: 2-12; and
voltage between the two electrodes: 0.5-2 V.

7. The method of claim 1, wherein the salt lake brine is selected from a primary salt lake brine, an evaporated salt lake brine, an evaporated salt lake brine after potassium extraction, or a mixture thereof.

8. The method of claim 1, wherein the first conductive substrate and the second conductive substrate are selected from the group consisting of a ruthenium-coated titanium mesh, a graphite plate, a platinum group metal, an alloy foil of the platinum group metal, a carbon cloth, and a graphite paper.

9. The method of claim 1, wherein parameters of the electrodialysis device are as follows:
temperature of solutions: 0-80° C.;
pH value of solutions: 2-12; and
voltage between the two electrodes: 0.5-2 V.

10. The method of claim 1, wherein the first ion sieve is selected from an iron phosphate, a lithium titanate, MnO$_2$, or a mixture thereof.

11. The method of claim 10, wherein the method further comprises preparing the first lithium-intercalated ion sieve by inserting Li$^+$ from the brine of the brine chamber into the first ion sieve under the external electric potential.

12. The method of claim 10, wherein
the iron phosphate is selected from Fe$_{1-x}$Me$_x$PO$_4$, Fe$_{1-x}$Me$_x$PO$_4$/C, or a mixture thereof, in which, Me represents Mn, Co, Mo, Ti, Al, Ni, Nb, or a mixture thereof, and 0≤x≤0.1; and
the lithium titanate is selected from Li$_4$Ti$_5$O$_{12}$, Li$_x$Me$_y$Ti$_5$O$_{12}$, Li$_4$Me$_m$Ti$_n$O$_{12}$, or a mixture thereof, in which, Me represents V, Fe, Co, Mn, Al, Ba, Ag, Zr, Sr, Nb, F, or a mixture thereof, 0<x<4, 0<y<4, 0<m<5, and 0<n<5.

13. The method of claim 1, wherein the first lithium-intercalated ion sieve is selected from a lithium iron phosphate, LiMn$_2$O$_4$, or a mixture thereof.

14. The method of claim 13, wherein the method further comprises preparing the first ion sieve by releasing Li$^+$ from the first lithium-intercalated ion sieve into the conductive solution under the external electric potential.

15. The method of claim 13, wherein the lithium iron phosphate is selected from LiFePO$_4$, Li$_x$Me$_y$FePO$_4$, LiFe$_x$Me$_y$PO$_4$, LiFePO$_4$/C, Li$_x$Me$_y$FePO$_4$/C, LiFe$_x$Me$_y$PO$_4$/C, or a mixture thereof, in which, Me represents Mn, Co, Mo, Ti, Al, Ni, Nb, or a mixture thereof, 0<x<1, and 0<y<1.

16. A device for extracting and enriching lithium according to the method of claim 1, the device comprising:
a) the electrodialysis device, the electrodialysis device comprising the electrodialysis cell being divided into the lithium salt chamber and the brine chamber via the anion exchange membrane;
b) the cathode; and
c) the anode;
wherein
the cathode and the anode are placed respectively in the two chambers;
the cathode is the first conductive substrate coated with the first ion sieve; and
the anode is the second conductive substrate coated with the first lithium-intercalated ion sieve.

17. A method for extracting and enriching lithium by using an iron phosphate ion sieve, the iron phosphate ion sieve being formed by releasing Li$^+$ from a lithium iron phosphate into a conductive solution under an external electric potential, the lithium iron phosphate being LiFePO$_4$, Li$_x$Me$_x$FePO$_4$ or LiFe$_x$Me$_y$PO$_4$, wherein Me represents Mn, Co, Mo, Ti, Al, Ni, Nb, or a mixture thereof; 0<x<1; and 0<y<1, the method comprising:
placing the iron phosphate ion sieve into a solution comprising lithium or salt lake brine comprising Li$^+$;
adjusting the electric potential of a system by applying an external voltage to reduce ferric ions of the ion sieve into ferrous ions, and to intercalate Li$^+$ into crystal lattices of the iron phosphate, thereby forming the lithium iron phosphate;
placing the lithium iron phosphate into a supporting electrolyte solution; and
adjusting the electric potential of the system to oxidize the ferrous ions of the ion sieve into the ferric ions and release Li$^+$ into the solution, thereby separating Li$^+$ from other ions and recovering the iron phosphate.

18. A method of extracting and enriching lithium, the method comprising:
coating a conductive substrate with lithium iron phosphate, placing the conductive substrate coated with lithium iron phosphate in a conductive solution to act as a first anode, using an inert electrode as a first cathode, applying an external electric potential across the first anode and the first cathode, and releasing Li$^+$ from the lithium iron phosphate into the conductive solution to form an iron phosphate ion sieve;
placing the iron phosphate ion sieve in a brine chamber to act as a second cathode, placing the conductive substrate coated with the lithium iron phosphate in a lithium salt chamber to act as a second anode, separating the brine chamber from the lithium salt chamber by using an anion exchange membrane, filling the brine chamber with brine comprising Li$^+$, and filling the lithium salt chamber with an electrolyte solution free of Mg$^{2+}$; and applying an external electric potential across the second anode and the second cathode, inserting Li$^+$ in the brine into the iron phosphate ion sieve, and releasing Li$^+$ from the lithium iron phosphate into the electrolyte solution.

19. The method of claim 18, wherein the lithium iron phosphate is LiFePO$_4$, Li$_x$Me$_y$FePO$_4$, LiFe$_x$Me$_y$PO$_4$, LiFePO$_4$/C, Li$_x$Me$_y$FePO$_4$/C, LiFe$_x$Me$_y$PO$_4$/C, or a mixture thereof, wherein Me represents Mn, Co, Mo, Ti, Al, Ni, Nb, or a mixture thereof, 0<x<1, and 0<y<1.

* * * * *